United States Patent [19]
Monget et al.

[11] Patent Number: 5,642,679
[45] Date of Patent: Jul. 1, 1997

[54] MACHINE FOR PRODUCING A REINFORCEMENT FOR A COMPOSITE COMPONENT

[75] Inventors: François Monget, Merignac; Georges Cahuzac, Le Bouscat, both of France

[73] Assignee: Societe Nationale Industrielle et Aerospatiale, Paris, France

[21] Appl. No.: 624,225

[22] Filed: Mar. 29, 1996

Related U.S. Application Data

[62] Division of Ser. No. 421,562, Apr. 13, 1995, Pat. No. 5,543,005.

[30] Foreign Application Priority Data

Apr. 18, 1994 [FR] France .................. 94 04581

[51] Int. Cl.$^6$ ............. D05B 69/02; D05B 73/00; D05B 85/00; D05B 19/00
[52] U.S. Cl. .......... 112/470.13; 112/220; 112/224; 112/259
[58] Field of Search ............ 112/117, 98, 470.12, 112/470.13, 102, 80.02, 80.41, 220, 259, 224, 2.1, 100, 470.18, 235, 236; 428/102; 28/115

[56] References Cited

U.S. PATENT DOCUMENTS

| | | | |
|---|---|---|---|
| 612,011 | 10/1898 | Blanchard | 112/235 X |
| 3,322,868 | 5/1967 | Kruse et al. | 264/45 |
| 3,425,884 | 2/1969 | Brinkema | 156/161 |
| 3,955,602 | 5/1976 | King | 139/11 |
| 4,038,440 | 7/1977 | King | 428/245 |
| 4,059,468 | 11/1977 | Bouillon | 112/412 X |
| 4,080,915 | 3/1978 | Bompard et al. | 112/412 |
| 4,218,276 | 8/1980 | King | 156/92 |
| 4,288,267 | 9/1981 | McLarty | 156/425 X |
| 4,503,788 | 3/1985 | Giannuzzi et al. | 112/470.06 |
| 4,864,947 | 9/1989 | Iwase | 112/470.13 |
| 4,917,756 | 4/1990 | Cahuzac et al. | 156/93 X |
| 5,019,435 | 5/1991 | Cahuzac et al. | 156/93 X |
| 5,103,747 | 4/1992 | Resta et al. | 112/470.13 X |
| 5,308,228 | 5/1994 | Benoit et al. | 156/93 X |
| 5,333,561 | 8/1994 | Katou | 112/470.13 |
| 5,428,853 | 7/1995 | Darrieux | 156/93 X |
| 5,469,329 | 11/1995 | Philpot | 156/169 X |
| 5,515,798 | 5/1996 | Cahuzac | 112/224 X |
| 5,543,005 | 8/1996 | Monget et al. | 112/470.12 X |

FOREIGN PATENT DOCUMENTS

| | | |
|---|---|---|
| 0284497 | 9/1988 | European Pat. Off. . |
| 0547738 | 6/1993 | European Pat. Off. . |
| 2355936 | 1/1978 | France . |
| 2395340 | 1/1979 | France . |
| 2531459 | 2/1984 | France . |
| 3712013 | 10/1988 | Germany . |
| 2159460 | 12/1985 | United Kingdom . |

Primary Examiner—Ismael Izaguirre
Attorney, Agent, or Firm—Marshall, O'Toole, Gerstein, Murray & Borun

[57] ABSTRACT

A machine for producing a reinforcement for a composite component. The machine includes a stand with a subframe having uprights with slideways for mounting a transverse bar on which is mounted a movable carriage. The carriage has a first movable arm extending in another direction and includes a second movable arm. The carriage is movable in a first direction, X, the first arm is movable in a second direction, Y, orthogonal to the first, and the second arm is movable transversely with respect to the plane defined by the bar and first arm in a third, Z, direction. Motors are provided to producing such movements. The second arm includes a thread-stitching tool which also constitutes a tool for laying down the thread and is mounted on a rotary support at the lower end of which is arranged the needle.

6 Claims, 12 Drawing Sheets

FIG.5

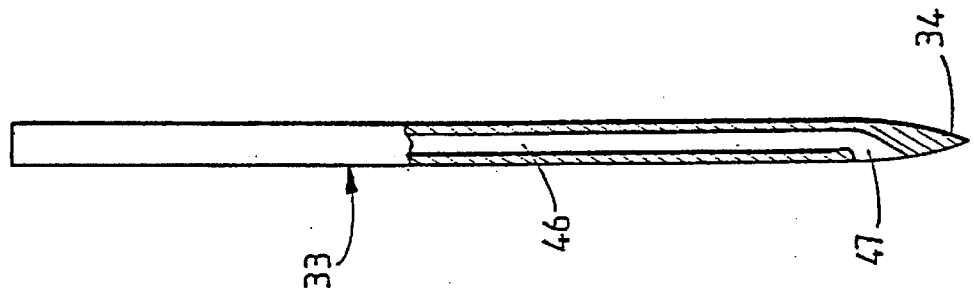
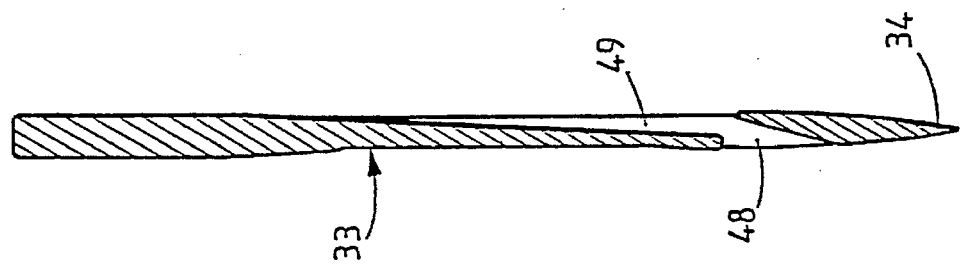
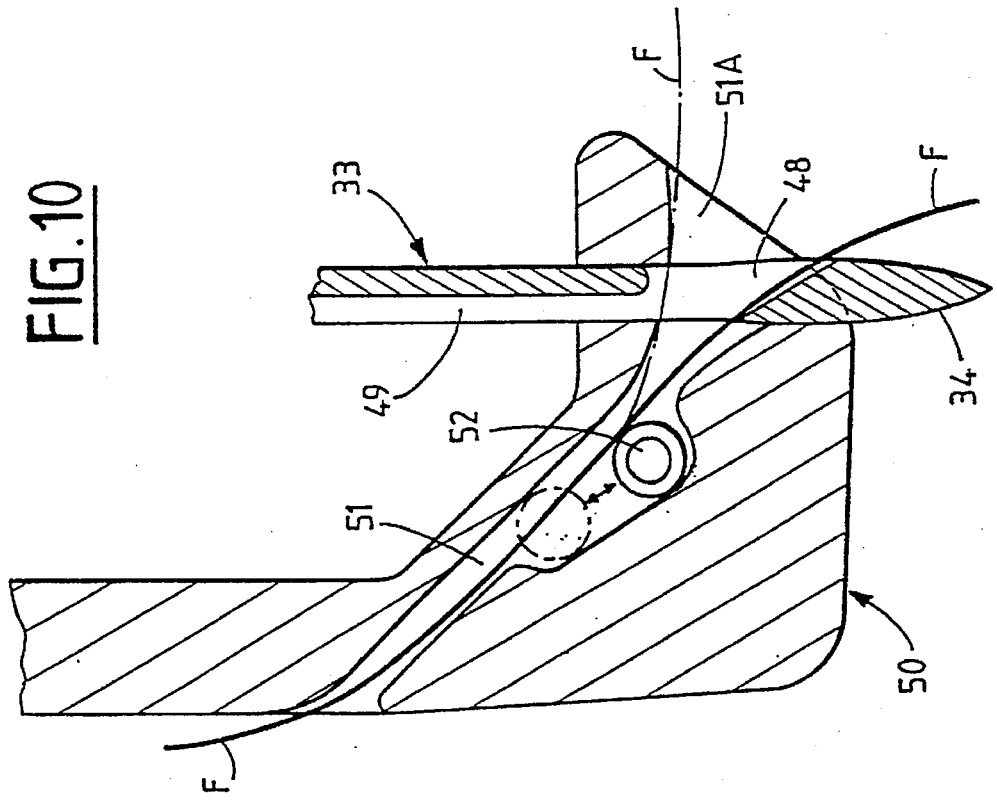

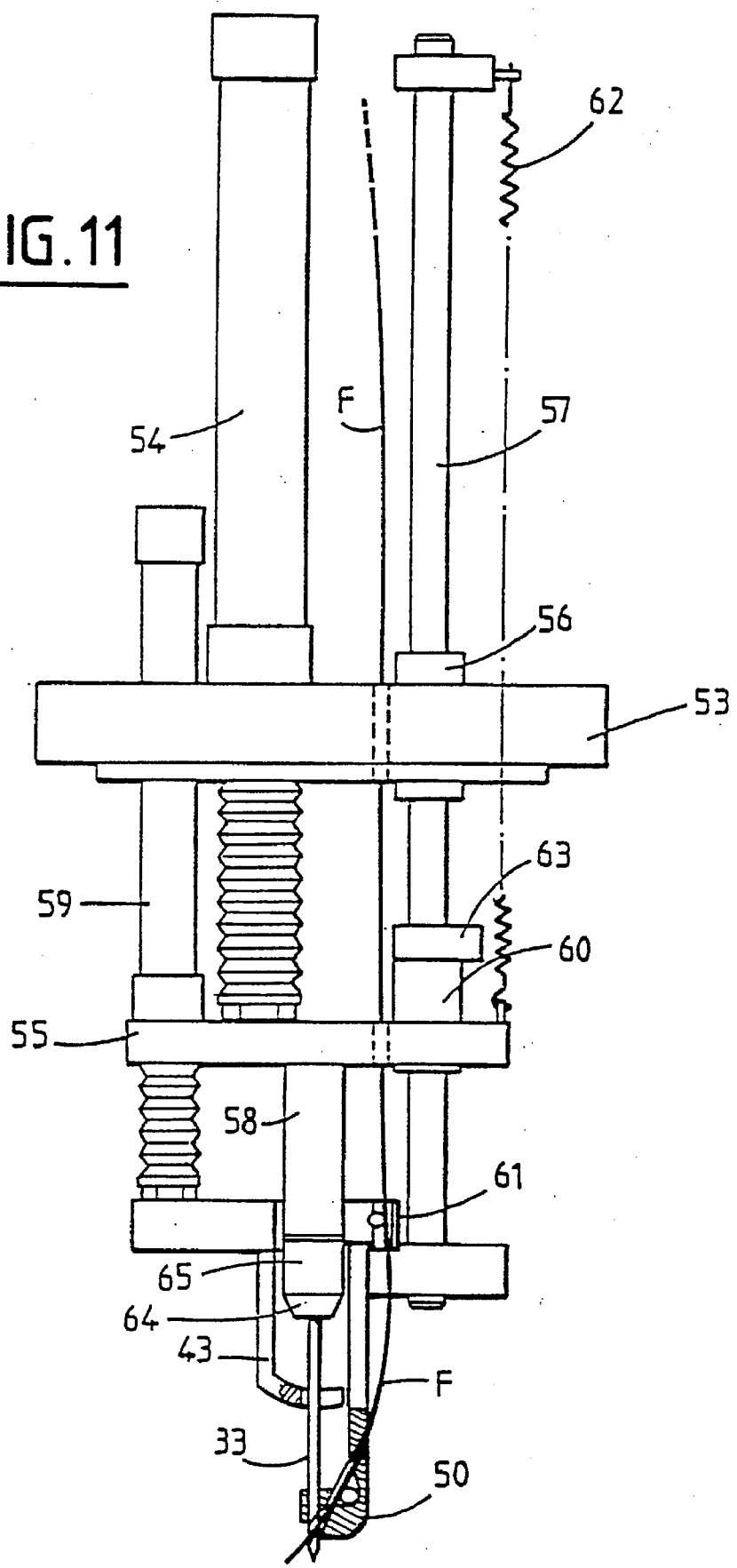

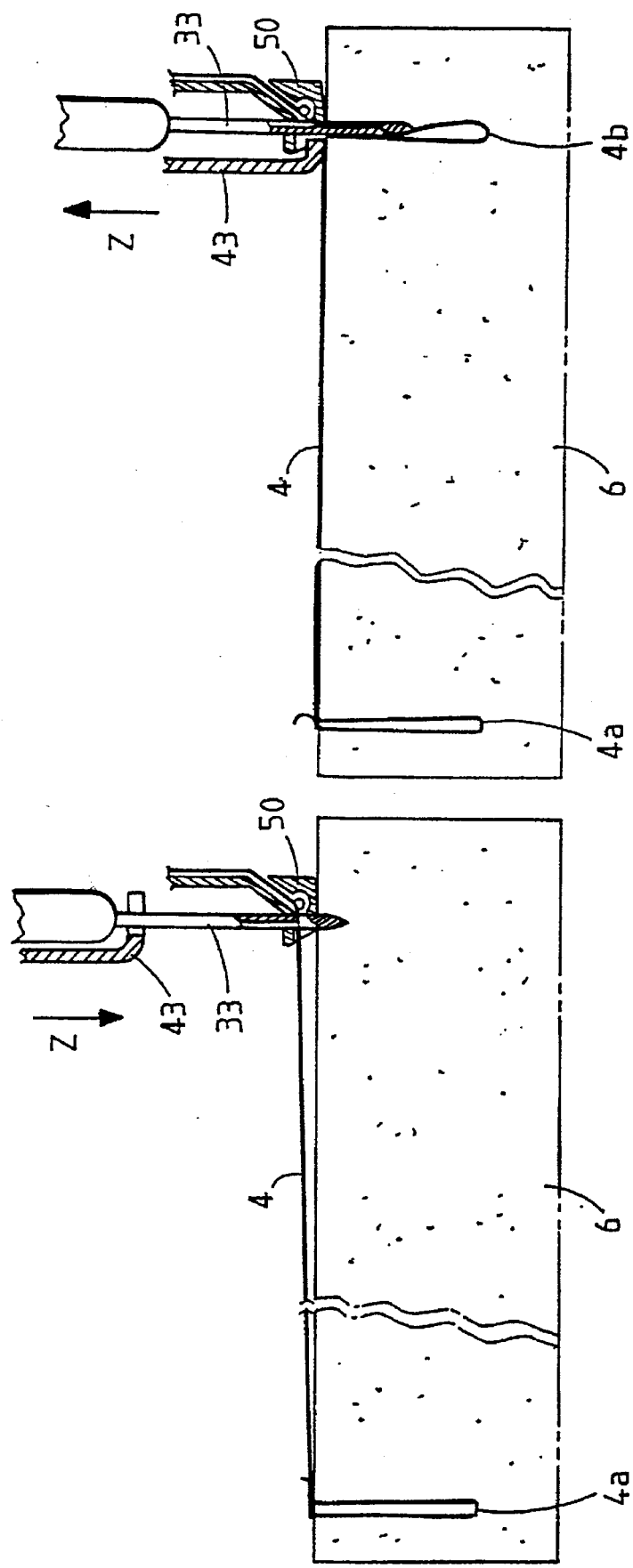

MACHINE FOR PRODUCING A REINFORCEMENT FOR A COMPOSITE COMPONENT

This is a divisional of U.S. application Ser. No. 08/421,562, filed Apr. 13, 1995, now U.S. Pat. No. 5,543,005.

The present invention relates to a method for producing a reinforcement for a composite component formed by said reinforcement embedded in a cured matrix, said reinforcement including superposed plies of thread (especially carbon, glass or boron thread) and to a machine for implementing said method, as well as to a reinforcement and a composite component which are thus obtained.

More particularly, although not exclusively, such composite components are used in the aeronautical and space fields by virtue of their excellent properties of resistance to mechanical and/or thermal stresses.

Many methods are known for obtaining said composite components and, especially, their reinforcement. In general, the first step is to produce the reinforcement from fibers (threads), in particular inorganic fibers, distributed in at least two directions, after which the material of the matrix is injected into the reinforcement and said material is cured in order to form said matrix and, thus, said composite component.

As regards more particularly the production of the reinforcement, a description is given, for example in Patent FR-A-2,408,676, of a method and of a device which use a support (mandrel) onto which are implanted rigid wire elements, forming "pegs", around which are arranged plies of threads in two different directions, said pegs moreover consolidating said plies.

The use of such pegs has many drawbacks. First of all, the pegs must be subjected beforehand to a stiffening treatment, which increases their diameter, in order to allow them to be implanted. In addition, the pegs, intended to become an integral part of the component to be produced in order to consolidate said plies, must consequently be provided in large number and implanted very close to each other, this representing a very lengthy and tricky operation requiring high precision.

Moreover, this close implantation of the pegs is very difficult to perform without interference between them in the case of a component having a complex shape, the surface of which forms angles or curves. The very narrow "corridors" which delimit the pegs do not allow easy laying-down of the threads in uniform plies, which laying-down is even impossible in the areas where the threads change orientation.

In addition, pegs which are too close to each other do not hold well, especially in the curved parts, this leading to defects in the uniformity of the finished component.

In order to remedy, at least partially, these drawbacks, a method is known, from the Applicant's Patent EP-B-0,284,497, for producing a reinforcement for a composite component formed by said reinforcement embedded in a cured matrix, said reinforcement including superposed plies of thread, according to which method:

at least some of said plies are produced by laying down straight portions of thread, forming part of a continuous thread, on a support, pulling tight each portion of thread between two points for positionally fixing the ends of said portion, the ply thus consisting of portions of thread extending at least substantially in a parallel fashion with respect to each other, and the portions of thread of said ply extending in a direction which is either parallel or crossed with respect to the direction of the portion of thread in any other ply of the reinforcement; and all the superposed plies are consolidated by stitching, without knotting, a continuous thread passing through said plies.

In this case, in order to lay down the straight portions of thread constituting the corresponding plies, a special device is used which comprises a tube, open at its lower end and having an opening at its upper part, for the passage of a continuous thread. This laying-down head allows each portion of thread to be pulled tight between points for positionally fixing its ends, these fixing points being formed by pins temporarily implanted in the support made of a material which can be penetrated by said pins, such as a foam of synthetic material. After forming the superposed plies of thread and after consolidating said plies, the pins are removed from the support.

Although satisfactory, this method still requires the implantation of a large number of pins in the support, with the drawbacks connected with it, and the use of a special head for laying down the lengths of thread.

The object of the present invention is to avoid the drawbacks of the prior art devices described and relates to a method for producing a reinforcement for a composite material, such as described, in which method the implantation of a large number of pegs, pins or the like is no longer necessary, and which renders superfluous the use of a laying-down head specific for the thread.

For this purpose, the method for producing a reinforcement for a composite component, of the type described hereinabove, is noteworthy, according to the invention, in that:

said straight portions of thread are laid down by means of a needle, with respect to which the continuous thread, partly formed by each of said portions, can slide, said needle being capable of moving relative to said support, pulling tight the straight portion of thread above the latter, to an extent equal to the length of said straight portion of thread; and said straight portions of thread are fixed by stitching, without knotting, at least one of the ends of each of said portions of thread into said support using said needle.

Thus, the straight portions of thread of each ply are laid down and fixed to the support, while being guided, without it being necessary, in order to do this, to use pins and a special laying-down head. Moreover, a single needle, which can, in addition, be used to consolidate the superposed plies, fulfills these two roles, namely laying down (and guiding) and positionally fixing the straight portions of thread.

For a reinforcement produced on an at least substantially planar support so that said reinforcement has a panel shape, said superposed plies including at least first and second plies, each consisting of straight portions of thread extending in a parallel fashion with respect to each other, the portions of thread of the first plies extending in a first direction and the portions of thread of the second plies extending in a second direction which is crossed with respect to said first direction, the method according to the invention is noteworthy in that the straight portions of thread of said first and second plies are put into place on said support and fixed to it using said needle, moved relative to said support, and stitching at least one of the ends of said portions into said support.

Moreover, for a reinforcement produced on an at least substantially cylindrical support so that said reinforcement has a corresponding cylindrical shape, said superposed plies including first plies each consisting of straight portions of thread extending in a parallel fashion with respect to each other in a first direction and second plies consisting of lengths of continuous thread which are produced by winding around said support, the method according to the invention is noteworthy in that the straight portions of thread of said first plies are put into place on said support and fixed to it using said needle, moved relative to said support, and stitching at least one of the ends of said portions into said support.

Advantageously, said first and second plies are laid down alternately on said support.

According to another characteristic of the invention, plies of straight portions of thread are laid down on said support, forming an angle with respect to the surface of the latter. This angle may be less than or equal to 15°.

The inclined plies thus obtained make it especially possible to reduce the phenomenon of ablation of the plies when the composite component comprising such a reinforcement acts as a heat shield, by eliminating the "peeling" effect which accelerates this phenomenon, as may be the case for plies consisting of non-inclined threads.

More particularly, successive plies of straight portions of thread are formed, the portions of thread of which have lengths which increase as a function of the row of said plies and have the same starting point.

Advantageously, the length of the straight portions of thread of the ply of row 1 being L1, the length of the straight portions of thread of the ply of row x is Lx=xL1.

Preferably, superjacent plies are formed for which the starting point of the straight portions of thread forming said plies is offset, each time, with respect to that of the superjacent plies.

Advantageously, for each superjacent ply, said offset is equal to L1 and the length of the portions of thread forming said superjacent plies is L=nL1, where n represents the number of superjacent plies for which the portions of thread have increasing lengths.

The present invention also relates to a machine for implementing the above method, of the type comprising a stand provided with a subframe and with uprights each having a slideway for mounting a transverse bar on which is mounted a carriage, which can move in a first, X, direction, equipped with a first arm extending in a second, Y, direction orthogonal to the X direction and carrying a second arm able to slide transversely with respect to the plane defined by said bar and said first arm in a third, Z, direction, motor means for driving said carriage and said first and second arms, and a thread-stitching tool mounted on the second arm, comprising, at its end, a needle, said machine being noteworthy in that said stitching tool also constitutes a tool for laying down the thread and is mounted on a rotary support at the lower end of which is arranged said needle.

In one case, said needle is hollow and a thread-guiding channel connected to said needle passes through said rotary support.

In the alternative case, said needle has an oblique through-eye and is associated with a thread-guide comprising a body through which passes obliquely a channel for passage of the thread, the lower end of said channel being flared.

Preferably, the laying-down and stitching tool comprises a mechanism for actuating the presser-foot/thread-guide/needle assembly, consisting of a first cylinder actuator actuating a plate on which said assembly is mounted, a spindle carrying the thread-guide and a second cylinder actuator actuating the presser-foot.

Advantageously, said needle is held in position on said plate by means of a support, using a conical clamp tightened by a nut.

Moreover, the spindle carrying the thread-guide is stressed by a tensioning spring and retained by a stop.

The figures of the appended drawing will make it clear how the invention may be realized. In these figures, identical references designate similar elements.

FIGS. 8 and 9 are views, in longitudinal section, of two embodiments of the needle used in the method of the invention.

FIG. 10 shows, in section, a thread-guide for the needle of FIG. 9.

FIG. 11 illustrates diagrammatically a stitching head equipped with a needle and with a thread-guide according to FIG. 10.

FIGS. 12A to 12H depict various steps in the laying-down, according to the invention, of a straight portion of thread.

Figure 1:
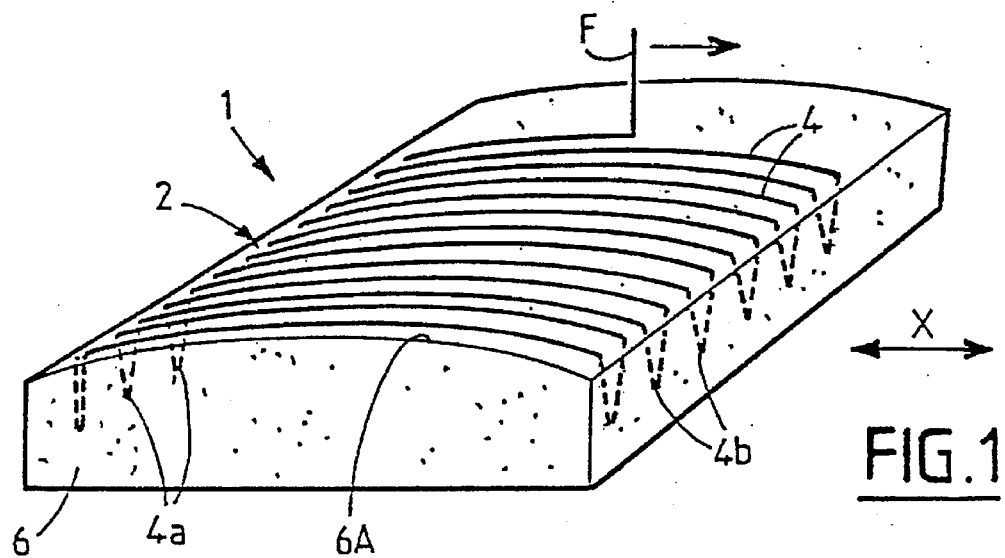
FIGS. 1 to 3 illustrate three steps of an example of the method according to the invention for producing a reinforcement for a composite component on a support having a convex upper surface.
Figure 2:
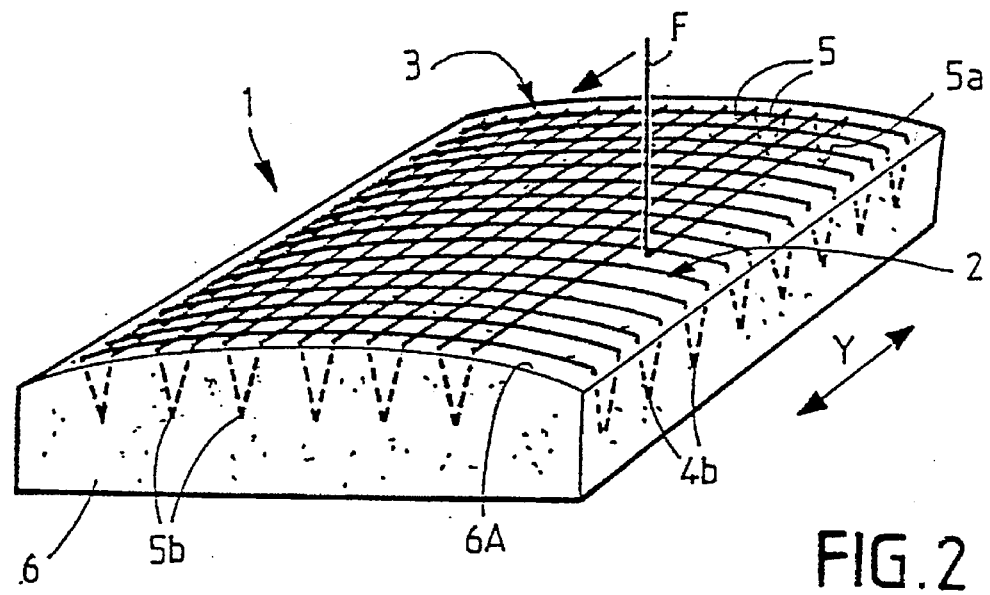
Figure 3:
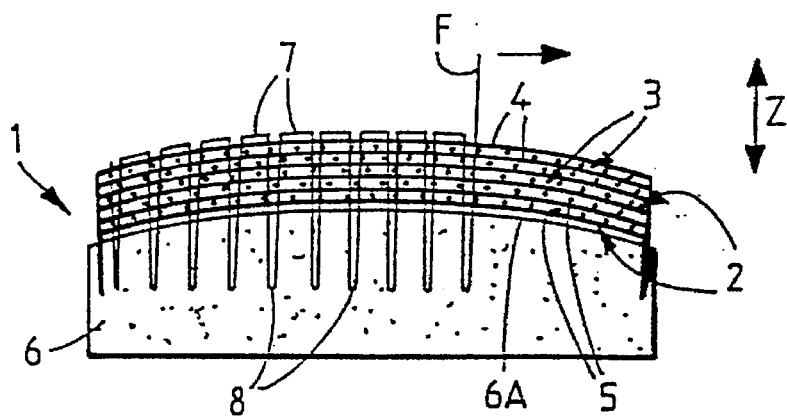

Depicted in FIGS. 1 to 3 are three steps in the manufacture of an embodiment of a reinforcement 1 according to the invention, comprising first and second superposed plies 2, 3 of continuous thread F.

Figure 4:
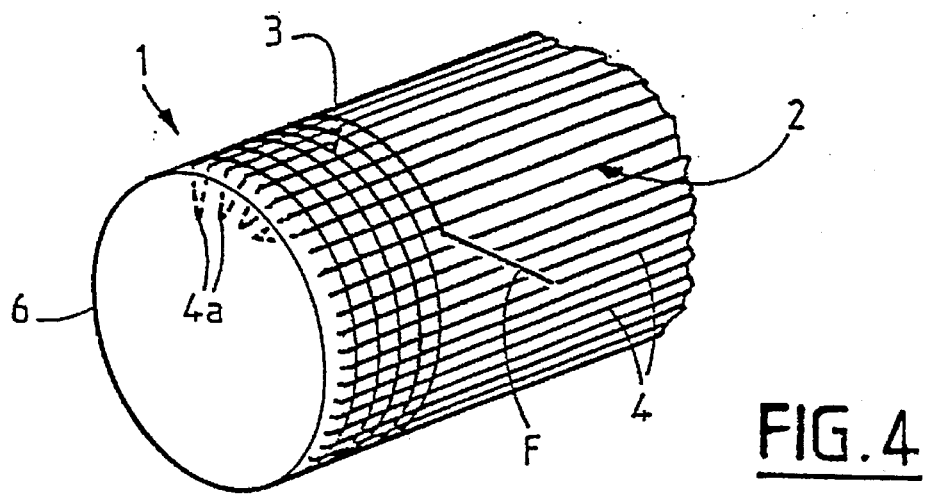
FIG. 4 illustrates the production of a reinforcement according to the invention on a cylindrical support.

More particularly, each ply 2, 3 is produced by laying down straight portions of thread 4, 5 forming part of a continuous thread F on a support 6. The latter must be sufficiently rigid while still being capable of being penetrated by needles, as will be seen in more detail below. A suitable material for the support 6 is a foam of synthetic material, especially a polyurethane foam. Moreover, depending on the shape of the reinforcement to be produced, and therefore on the composite component of which it forms part, the support may have any suitable shape for producing the corresponding reinforcement. One example of it is shown in FIGS. 1 to 3 in which the support 6 has a convex upper surface 6A adapted to the manufacture of a reinforcement having the shape of a curved panel. Another example is illustrated in FIG. 4, in which the support 6 is a cylindrical mandrel allowing a corresponding cylindrical reinforcement to be produced.

As shown in FIGS. 1 to 3, each ply 2, 3 consists of portions of thread 4, 5 extending in a parallel fashion with respect to each other. In addition, as illustrated in these figures, the portions of thread 4 of the first plies 2 extend in a first, X, direction, while the portions of thread 5 of the second plies 3 extend in a second, Y, direction which is crossed with respect to the first, X, direction and is especially orthogonal with respect to the latter, as shown. In the embodiment of FIGS. 1 to 3, the reinforcement 1 therefore comprises an alternating succession of first plies 2 and of second plies 3, the straight portions of thread 4, 5 of which extend in two crossed directions. In other words, the reinforcement 1 is a sheeted structure, any two successive "sheets" of which have segments of thread (or fiber) extending in two crossed directions. Each sheet of the structure comprises one or possibly more "layers" of thread which consists especially, as already indicated, of carbon, glass or boron.

Furthermore, in order to lay it down, each portion of thread 4, 5 is pulled tight between two points for positionally fixing the ends 4a, 4b; 5a, 5b of said portion. In accordance with the invention, and as will be seen in more detail below, this is achieved by means of a needle, with respect to which the continuous thread F, that each of said portions 4, 5 forms part of, can slide, the needle being capable of moving relative to the support 6, pulling tight the straight portion of thread 4, 5 above the latter, over a path equal to the length of the straight portion of thread 4, 5 which is fixed by stitching, without knotting, one of its ends 4a, 4b; 5a, 5b into the support 6, using the needle, possibly passing through already-laid down subjacent plies of thread. This procedure will be described in more detail with regard to FIGS. 11A–11H.

After forming all the superposed plies 2, 3, these are consolidated by stitching, without knotting, in the Z direction, a continuous thread F passing through said plies, and forming stitches 7 having open loops 8, the latter extending into the support 6, as will be described in more detail with regard to FIGS. 12A to 12D.

It should be noted that, in FIGS. 1 and 2, for reasons of representation (sufficient spacing between the portions of thread 4, 5 in order to make the illustration clear), the loops of thread which are formed at the ends 4a, 4b; 5a, 5b appear in the form of a V, whereas in reality they form part of the loops 8 of FIG. 3.

Moreover, assuming that the X direction is at 0° and the Y direction at 90°, it is, of course, equally possible to lay down portions of thread at any angle, especially at 45° and 135°.

FIG. 4 illustrates the case of a cylindrical support 6 for producing a reinforcement and therefore a composite component of corresponding shape. Here, the plies 2, the portions of thread 4 of which extend in a parallel fashion to the generatrix of the cylinder, are laid down, as previously, by stitching the two ends of each portion of thread 4 into the support 6, while the second plies 3 may be simply formed by winding a continuous thread F around the cylindrical support 6; since the first plies 2 and second plies 3 are laid down alternately on the support, that is to say that any one ply of the reinforcement is laid down each time between two plies of the other category, except, of course, the lowermost ply (laid down directly against the support) and the uppermost support (forming the upper surface of the reinforcement).

Figure 5:
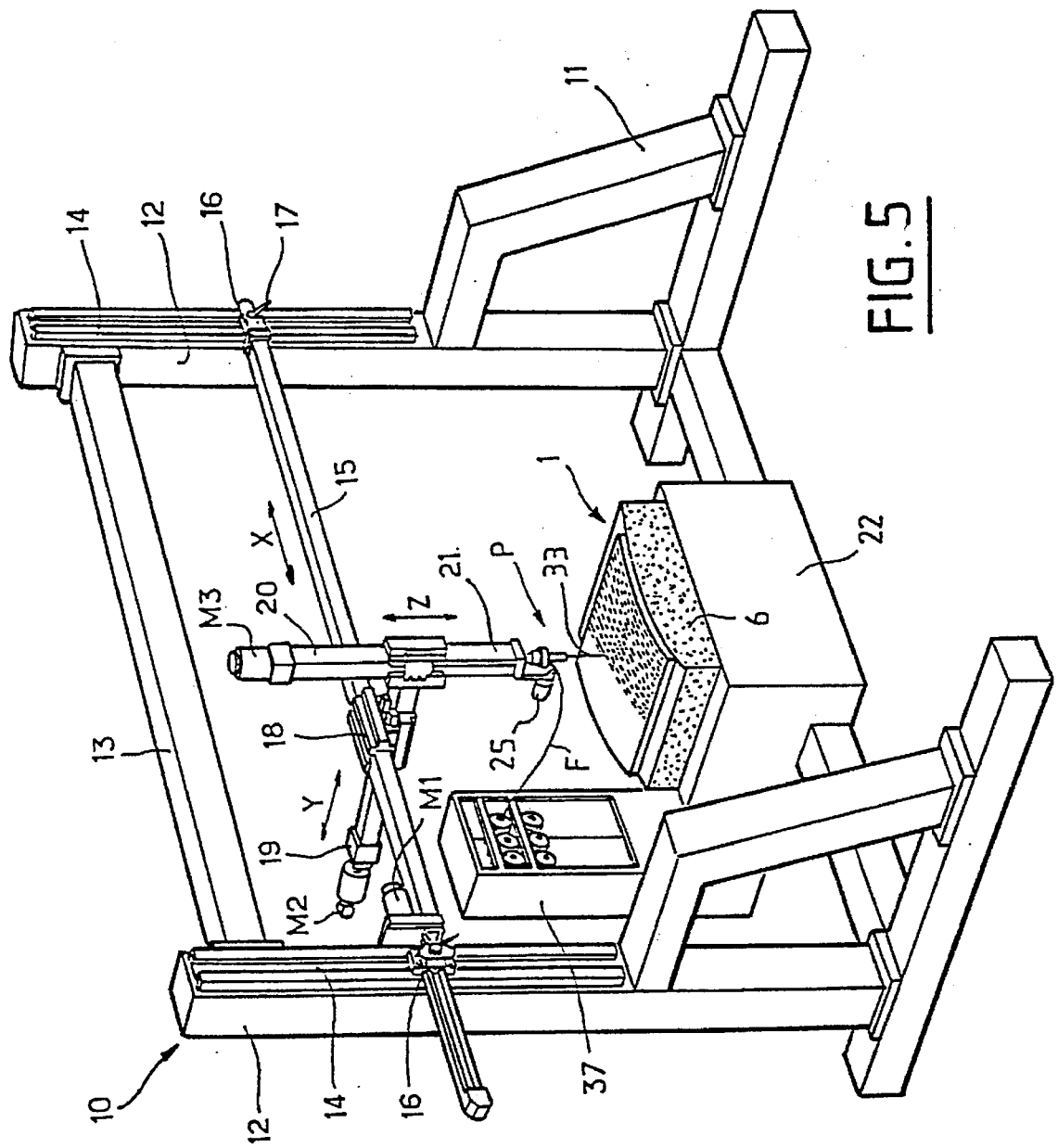
FIG. 5 shows diagrammatically, in perspective, a machine for producing the reinforcement of FIGS. 1 to 3.

In order to produce, especially, the reinforcement 1 shown by FIGS. 1 to 3, the machine 10 requiring no knotting of the thread F may be employed, this machine being illustrated diagrammatically in FIG. 5 and described in Patent EP-B-0,284,497.

This machine 10 comprises a stand provided with a subframe 11 and with vertical uprights 12 joined at their upper part by a horizontal crosspiece 13.

Each vertical upright 12 comprises a slideway 14 and a transverse bar 15 which is fixed near its ends in slides 16 mounted in the slideways 14 in which they can be immobilized by screws 17. By virtue of this arrangement, it is possible to adjust the height of the bar 15 on the uprights 12.

Mounted on the bar 15 is a carriage 18 on which is provided a horizontal arm 19 which can slide transversely and adjustably with respect to the bar 15.

At one of its ends, the horizontal arm 19 carries a vertical arm 20 which is also mounted in a sliding and adjustable manner.

Figure 6:
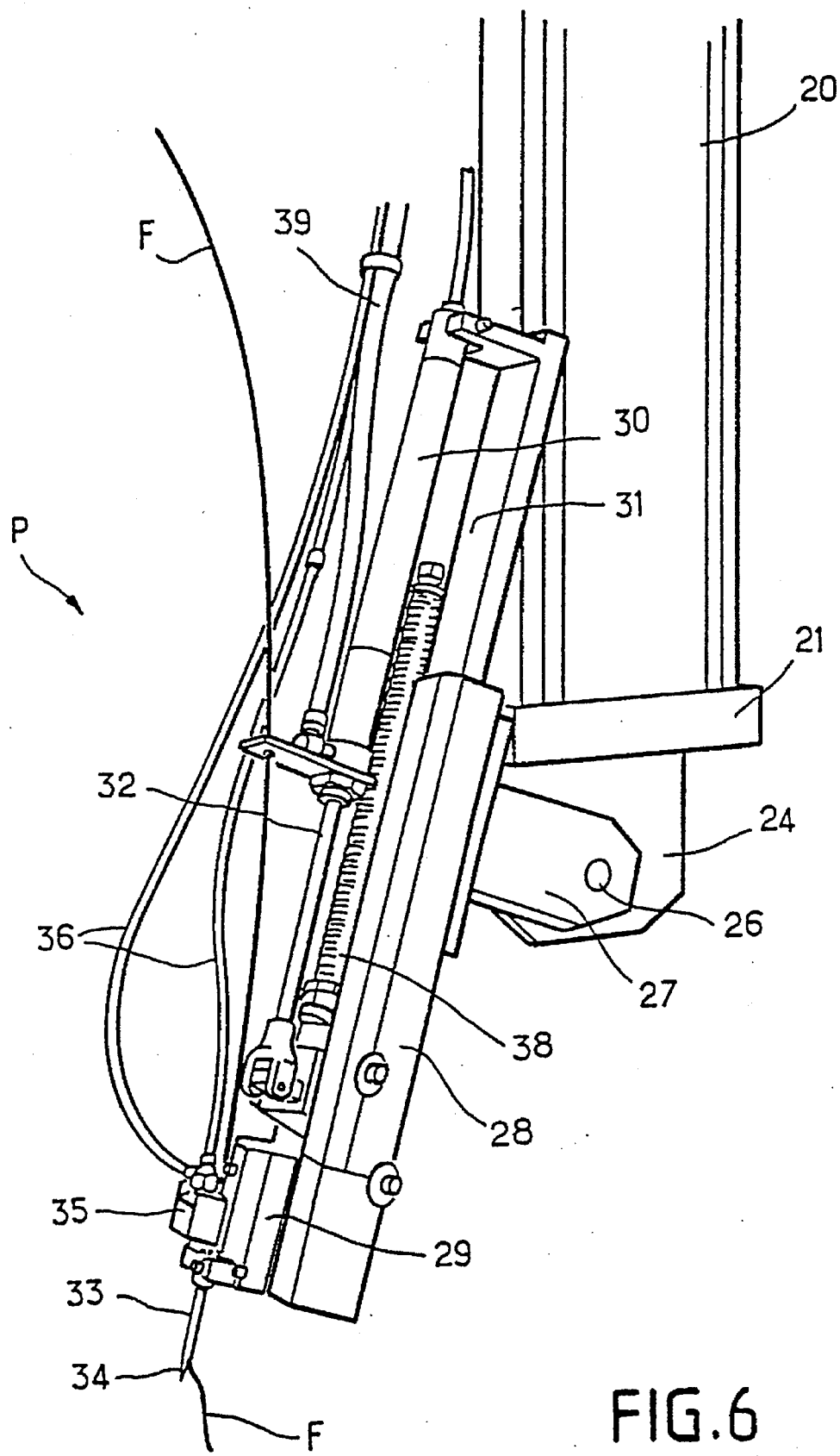
FIG. 6 is a diagrammatic view, in perspective, of a stitching device for the machine of FIG. 5.

At its lower end 21, the vertical arm 20 comprises fixing means adapted to receive a laying-down and stitching device P, which is more clearly visible in FIG. 6.

The machine furthermore includes a base 22, supporting a support 6 for the reinforcement 1, having the shape shown in FIGS. 1 to 3.

It will be noted that, in FIG. 5, the plies 2 and 3 have already been laid down and that the stitching device P is in the process of consolidating the superposed plies.

It is understood that, by virtue of the arrangement of the bar 15 and of the arms 19 and 20, the end 21 may be adjusted to any desired position with respect to the support 6, along three orthogonal axes X, Y and Z, by means of motors M1, M2 and M3 which are represented, by way of example, mounted on the bar 15 and at the ends of the arms 19 and 20 and drive the latter along these three axes by means of suitable known systems with a rack and pinion, worm or the like.

As FIG. 6 shows, the lower end 21 of the arm 20 comprises a foot 24 which is fixed in its extension and on which an electric motor 25 is fixed, for example a stepper motor, the horizontal shaft 26 of which extends through the foot 24.

It will be noted that the stitching device P may be oriented in a vertical plane, through the action of the motor 25.

The stitching device P, mounted on the lower end 21 of the vertical arm 20, includes a support 27, fixed to the shaft 26, on which is fixed a rail 28, a block 29 sliding in the rail 28, a pneumatic cylinder actuator 30, the cylinder of which is fixed on an extension 31 of the rail 28, joined to the latter and the piston rod 32 of which is connected to the block 29.

The block 29 carries a needle 33, described in detail below.

The opposite end of the needle to its point 34 is fixed beside a pneumatic thread-gripper 35, of known type, mounted on the block 29.

The thread-gripper 35 is connected via conduits 36 to a source of compressed air (not shown) and the thread F, originating from a source 37, supplies said needle 33.

A return spring 38 is provided between the block 29 and the rail 28, so that when the cylinder actuator 30, supplied via a pipe 39, has pushed the block 29 into an extended position and is then set to release, the spring 38 pulls back the block 29 and the needle.

It will be noted that, by virtue of the motor M3 and/or the cylinder actuator 30, it is possible to adjust the depth of penetration of the needle 33.

Figure 7:
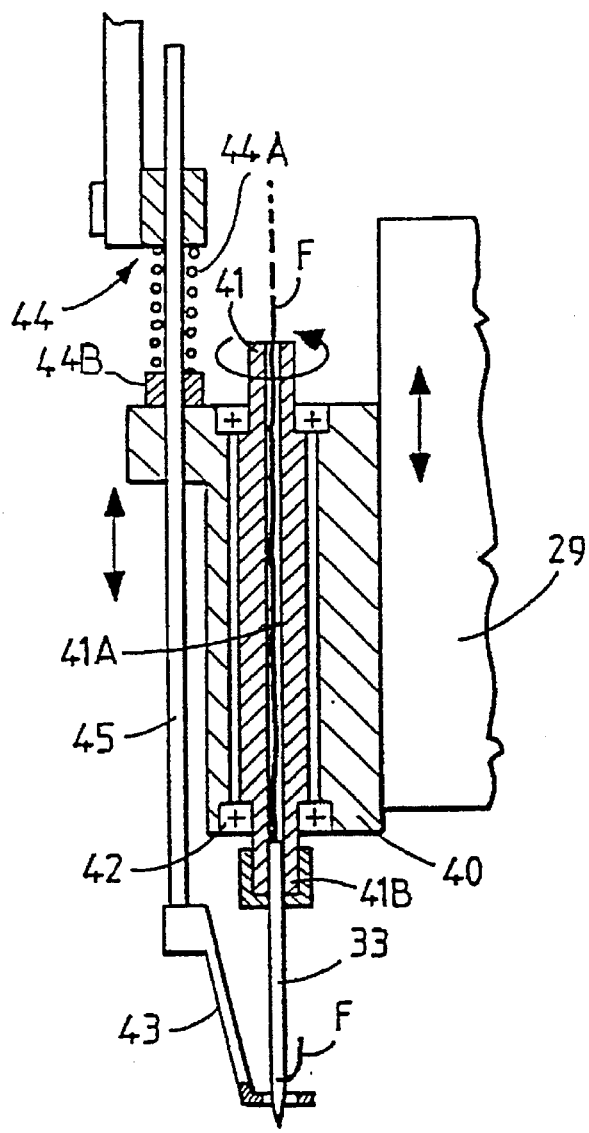
FIG. 7 is a diagrammatic view, in section, illustrating an arrangement according to the invention of a stitching needle.

Moreover, in order to allow the to-and-fro motion of the needle 33 with respect to the support 6 (in order to lay down the successive portions of thread of one ply), provision is made, as is seen in FIG. 7, for a support 40, mounted on the block 29, in which is arranged a guide 41, able to rotate on the bearings 42 by virtue of driving means which are not depicted, through which guide passes a longitudinal channel 41A for the passage of the thread F and the lower end 41B of which guide carries the needle 33. In addition, as also shown in this FIG. 7, a presser-foot 43 is associated with the needle 33, which presser-foot may be set in motion parallel to the longitudinal extension of the needle using a spring mechanism 44. More particularly, the spring mechanism 44, controlling the presser-foot 43, includes a linkage bar 45, pushed downward by a compression spring 44A and retained by a stop 44B in contact with the support 40 of the needle 33 when the needle is outside the laid down plies. When the needle 33 descends, the presser-foot 43 is retained by the plies and the spring 44A exerts a compressive force on the plies.

As illustrated in FIG. 8, the needle 33 may be a hollow needle through which passes an axial channel 46, for passage of the thread, and which includes a nonthrough eye 47 into which the channel 46 emerges laterally and obliquely.

However, the needle 33 may advantageously be as depicted in FIG. 9, that is to say it comprises an oblique through-eye 48 emerging into a longitudinal groove 49 of cross section in the form of a circular arc, the depth of which groove decreases progressively on going away from the tip 34 of the needle and through which groove the thread is intended to pass.

When this latter needle is used, a special thread-guide may be provided, as shown in FIG. 10. The thread-guide has a body 50, substantially in the form of an L, through which passes obliquely a channel 51 for the passage of the thread F, the lower end 51A of said channel being flared in order to allow the thread to be guided, either substantially vertically or substantially horizontally (thread F depicted by the dot-dash lines), as will be seen in more detail below. A wheel 52 releases the thread F, by advancing into the channel 51, and traps it, by moving back into said channel. In fact, it is the sliding of the thread which, on pulling downward, makes the wheel 52 rotate, opening the channel 51, whereas a rearward motion ("rise" of the thread) blocks the thread once again.

In FIG. 11, a stitching head is shown which comprises the presser-foot 43/thread-guide 50/needle 33 assembly (FIG. 13). A pneumatic cylinder actuator 54, which actuates a plate 55, is screwed onto a circular flange 53 which may be fixed, while still being able to rotate, to the tool holder of the machine 10. Moreover, the flange 53 carries a bush 56 with balls for guiding a spindle 57. The plate 55 itself carries a support 58 for the needle 33, an auxiliary cylinder actuator 59 and a second bush 60 with balls sliding on the spindle 57. The auxiliary cylinder actuator 59 carries the presser-foot 43 and a thread-gripper 61, similar to the thread-gripper 50, for the thread F, while the guiding spindle 57 carries the thread-guide or thread-gripper 50, being stressed by the tensioning spring 62 and retained by a stop 63. The needle 33 is held in position on the support 58 using a conical gripper 64 tightened by a nut 65.

Depicted in FIGS. 12A to 12H are the various steps in the laying down, according to the invention, of a straight portion of thread. For the convenience of representation, it is assumed in these figures that the portion of thread laid down belonged to a first ply 2, the portions of thread of which extend in the X direction and that this ply was the lowermost ply of the reinforcement, that is to say it was laid down directly on the planar support 6. Needless to say, the laying-down principle illustrated in these FIGS. 12A to 12H is applicable for any ply of the reinforcement, consisting of straight portions of thread, and whatever this portion. Moreover, the various operations described may be performed using the machine 10 of FIG. 5, especially.

Figure 12C:
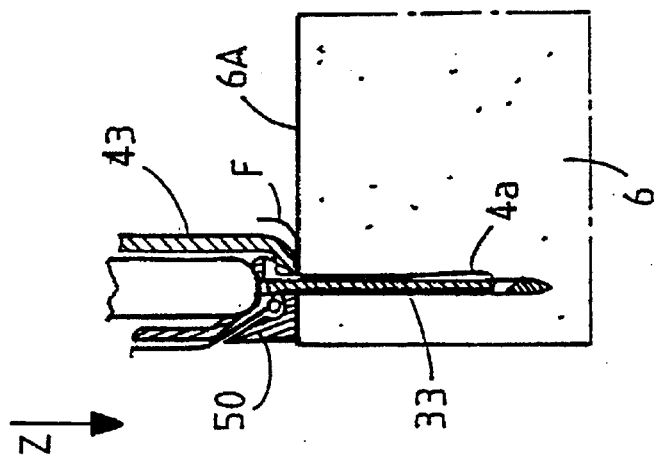
Figure 12B:
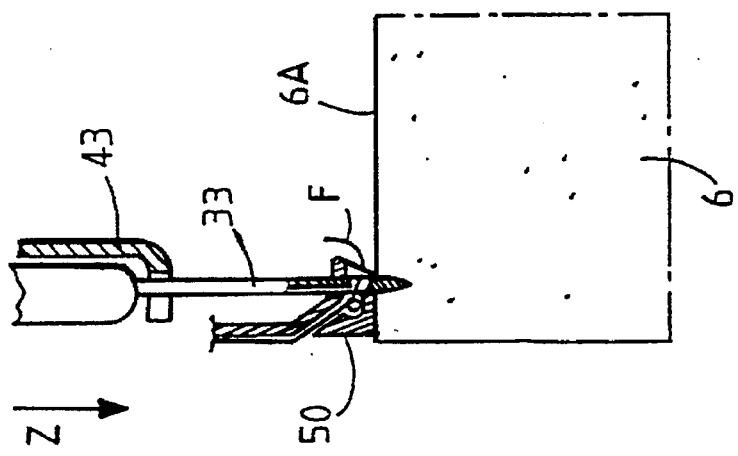
Figure 12A:
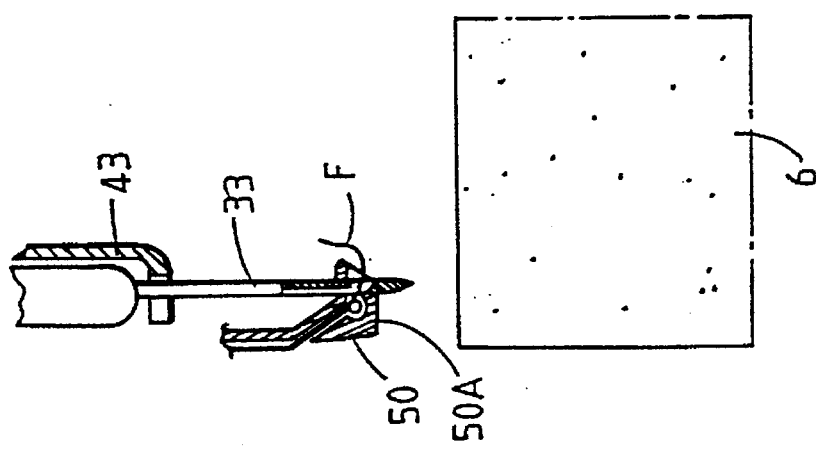

With the needle 33, together with the presser foot 43 and the thread-guide 50, being in the position depicted in FIG. 12A near one end of the support 6, the assembly is firstly lowered, parallel to the Z direction, into the position illustrated by FIG. 12B, in which the lower face 50A of the thread-guide 50 rests on the upper surface 6A of the support 6, while the needle has started to penetrate into the support 6. Next, the needle 33 penetrates "deeply" into the support 6, entraining the thread F, at the same time that the presser-foot 43 comes down against the support 6, allowing formation and locking of the open loop 4a (FIG. 12C).

Figure 12F:
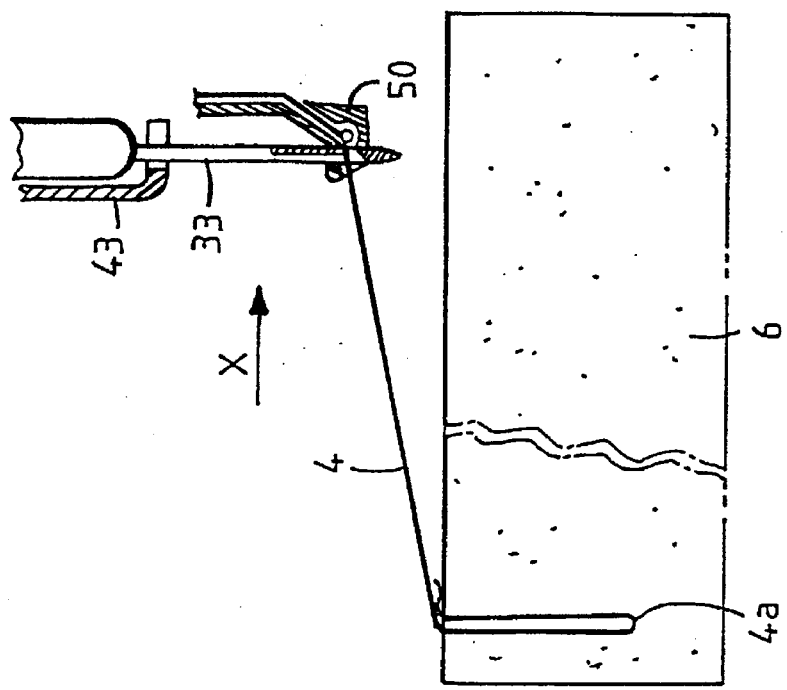
Figure 12E:
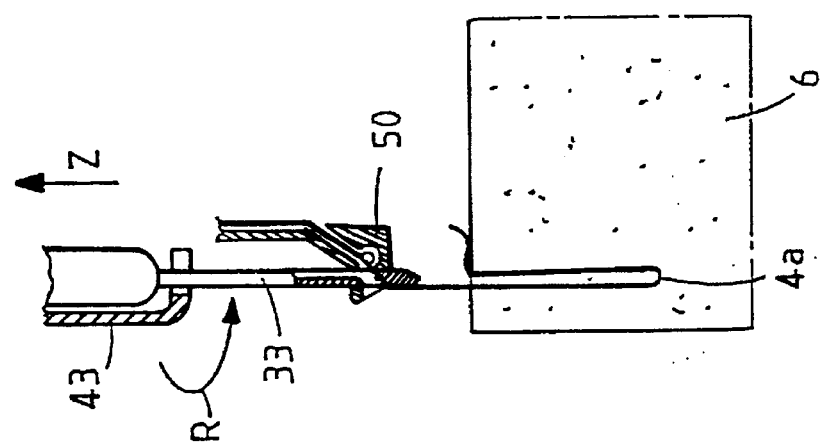
Figure 12D:
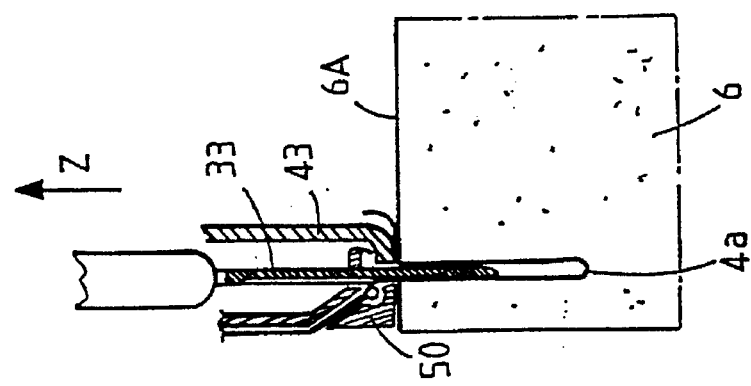

In the next step (FIG. 12D), the needle 33 is raised up in the Z direction, while the loop of thread remains in the support by virtue of the friction between the material of the thread and the material of the support and because the thread is held in place by the presser-foot 43 remaining in the down position bearing against the support. The needle 33/presser-foot 43/thread-guide 50 assembly is then raised up and rotated through 180° (arrow R in FIG. 12E), after which the assembly is driven translationally in the X direction towards the other end of the support 6 (FIG. 12F). This may be achieved by means of driving means forming part of the machine 10 shown in FIG. 5. The thread, unreeled from its bobbin and sliding with respect to the needle 33, is thus pulled tight, above the support 6, between the first stitch (end 4a) and the stitch (end 4b) at the opposite end of the support 6, forming a straight portion 4 (FIGS. 12G and 12H). The stitch at the end 4b is formed in the same way as that at the end 4a. It is thus clear that the straight portion of thread 4 is guided and held in position on the support 6 simply by stitching the thread, at both ends of the portion, into the support. It is therefore no longer necessary to use pins or similar means in order to do so.

Figure 13A:
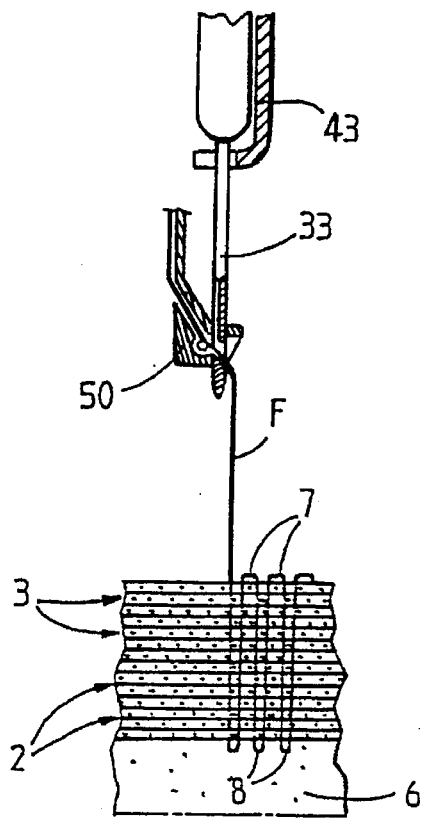
FIGS. 13A to 13D illustrate diagrammatically the procedure for consolidating the superposed plies of the reinforcement produced in accordance with the invention.
Figure 13B:
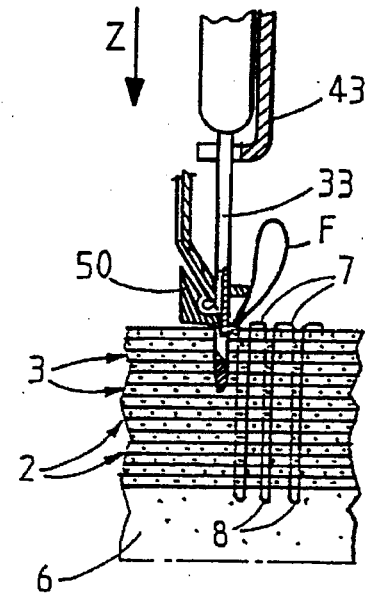
Figure 13C:
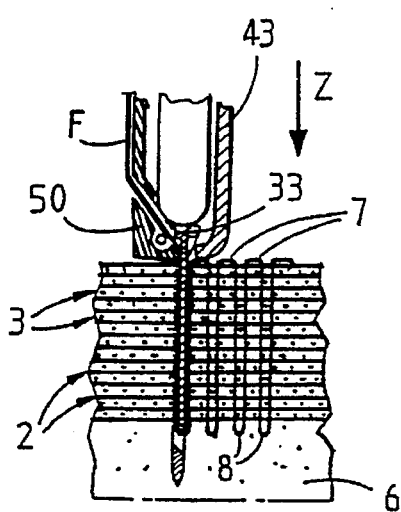
Figure 13D:
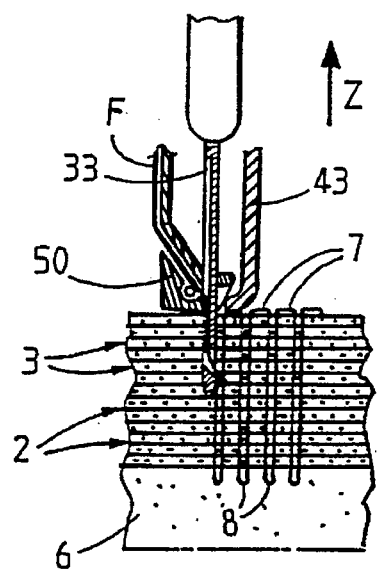

In order to consolidate the superposed plies 2, 3, stitching is performed, as shown in FIGS. 13A to 13D, in the Z direction. In order to do this, while inserting the needle 33 into the plies 2, 3, the thread F is driven by said needle through the plies 2, 3 (FIG. 13B), the thread-gripper (not depicted in FIGS. 13A to 13D) being tightened up and the travel of the needle being adjusted so as to penetrate into the support 6. As the needle 33 is being withdrawn from the plies 2, 3, the thread-gripper is slackened off and the needle moves out, progressively releasing the thread F through the plies 2, 3, thus forming a nonclosed loop 8 which is retained solely by the foam forming the support and by the friction of the thread in the plies 2 and 3 (FIGS. 13C, 13D).

Thus, it is by virtue of the elastic pressure of the foam closing up over the loop after the needle has been withdrawn on the one hand, and of the friction and gripping in the plies 2, 3 on the other hand, that, when the needle has been withdrawn, the thread F, which passes freely through the needle during this withdrawal, is retained in order to form the open loop 8.

After it has been removed from the plies 2 and 3, the needle is moved up above the surface of said plies by a distance equal to the thickness to be stitched plus the stitching pitch 7, that is to say the spacing desired between two stitches.

The thread-gripper is then actuated in order to lock the thread in the needle, the arm 20 is moved by one pitch and the device is once again actuated in order to restart the cycle so as to form continuously a large number of loops with the same thread F, that is to say in order to form the stitches 8 of one row.

Of course, by acting on the motor M2 at the end of a row, it is possible to bring about a relative displacement of the needle 33 with respect to the reinforcement 1, in order to be able to make the next row of loops. Moreover, by the action of the motor 25, it is possible to adjust, as required, the inclination of the needle 33 about the pin 26, and therefore the desired inclination for the loops 8 of each row.

It should be pointed out that, in the case of a complex shape, especially one which cannot be laid flat, it might be necessary to mount the stitching device P at the end of an arm which can move with a very large number of degrees of freedom (for example 7).

This technique is also described in Patent EP-B-0,284, 497. However, in the present case, the needle (with its presser-foot and its thread-guide) of FIGS. 12A to 12H may advantageously be used.

In this regard, also in relation to FIG. 11, the needle 33 is lowered by the cylinder actuator 54 which descends, driving the plate 55 and therefore all the components fixed to said plate. At the start of this descent, that is to say before the needle 33 penetrates into the superposed plies 2, 3, the thread F is held in place by the thread-gripper 61 and the thread-guide 50, also acting as a thread-gripper, and forms a loop (FIG. 13A).

When the needle 33 penetrates into the plies 2, 3, the thread-guide 50 comes into contact with these plies, immobilizing the spindle 57, and the thread F slides in the thread-guide 50, while the previously formed loop of thread is pushed into the plies (FIG. 13B). When the needle 33 has reached its lowermost position (FIG. 13C), the presser-foot 43 is brought into contact with the uppermost ply by actuation of the cylinder actuator 59 in order to lower it, this ensuring compaction of the superposed plies, and then the rise of the cylinder actuator 54, and thus of the needle 33, is initiated (FIG. 13D).

While the needle 33 is rising through the plies 2, 3, the presser-foot 43 remains pressed against these plies under the thrust of the associated cylinder actuator 59. The thread is then gripped by the thread-grippers. When the stop 63 comes back into contact with the bush 60, the thread-guide 50 rises up with the needle 33 and the thread slides in the former. The end of the rise of the needle 33 initiates the rise of the presser-foot 43. The thread is gripped by the thread-guide 50 and slides in the upper thread-gripper 61.

It will be noted that the length of thread consumed during each stitching operation may be measured by the rotation of a coder (not depicted) and compared with a programmed value.

In this case, the mechanical integrity of the reinforcement is essentially obtained by the friction of the consolidating thread on the portions of thread constituting the superposed plies, without applying stress on said consolidating thread, this being so by virtue of the prior compacting of the superposed plies carried out in order to reach a sufficient density of the portions of thread constituting them. This is particularly useful in the case where sheets (whether plane or curved) are produced, that is to say sheets not comprising circumferential windings which already provide integrity of the reinforcement. The density of the portions of thread constituting the superposed plies is such that the portions of thread occupy at least 40% of the volume of the composite component, the remainder being occupied by the consolidating thread and the matrix. Preferably, the portions of thread occupy between 40 and 60% of the volume of the composite component, while the consolidating thread occupies from 1 to 10% of the volume of the composite component.

Figure 14:
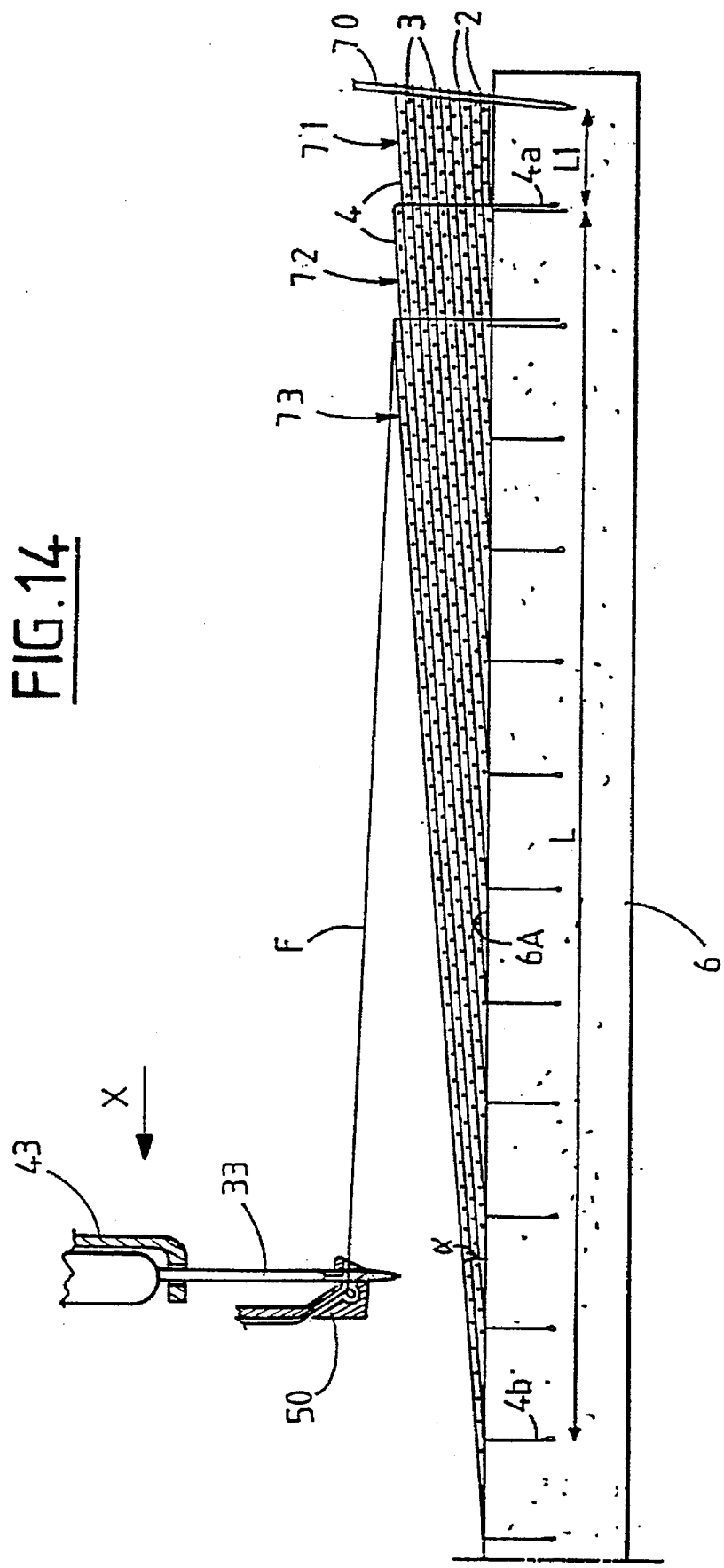
FIG. 14 illustrates diagrammatically the production of inclined plies, constituting a variant of the reinforcement according to the invention.

FIG. 14 illustrates a variant of the method according to the invention, in which plies of thread (for example the plies 2 whose portions of thread 4 extend along the X direction) are laid down on the support 6, forming an angle α, less than or equal to 15°, with respect to the surface 6A of the support 6. It will be noted that, in the case of a cylindrical support, this angle α is taken with respect to the generatrix of the cylinder.

More specifically in this case, a "wedge" 71 (or first "tile") is firstly produced, this consisting of straight portions of thread having the same origin, this being represented, as shown, by a pin 70 around which pass said portions (it being possible for this pin also to be replaced by stitches, as previously), and having a length which increases from the lowermost ply 2 (against the support) of row 1 up to the uppermost ply of row n, so that, the length of the portions of the lowermost ply being L1, designated as the "slope-constructing pitch", the length of the portions of the following plies is preferably Lx=xL1 (x being an integer designating the row of the ply in question). Arranged between two successive plies produced in this way is a ply 3 whose portions of thread extend in a crossed direction with respect to the X direction, especially the Y direction orthogonal to X, this being achieved for example by winding or by another way such as that described previously, depending on the geometry of the support. This provides, at least partially, compacting of the previously produced plies.

In order to implement this method, the machine 10 illustrated in FIG. 5 may be used, this comprising the needle 33/presser-foot 43/thread-guide 50 assembly, as shown in FIG. 14.

In order to produce the following "tiles" 72, 73, etc., the starting point of the portions of thread 4 are offset by one pitch (length L1), and a length of thread L, equal to the length of the portions of thread of the uppermost ply of the preceding tile (L=nL1) is laid down. Each tile thus produced comprises a ply thus formed (as shown in FIG. 14). As previously, a ply, whose portions of thread extend along a crossed direction, is provided between two plies forming the successive tiles.

The consolidation of the superposed plies 2, 3 is obtained, as previously, by stitching along the Z direction (FIG. 3 and FIGS. 13A to 13D).

This structure, comprising inclined plies, makes it possible to counteract the phenomenon of ablation of the plies by eliminating the "peeling" effect which accelerates said phenomenon. In fact, in service as a heat shield, in the composite component comprising such a reinforcement, only part of the plies of the reinforcement may be exposed to the heat flux, this increasing the ablation resistance of the heat shield. Moreover, since the plies are inclined, the diffusion of the heat is slower from the outside toward the inside of the heat shield.

Figure 15:
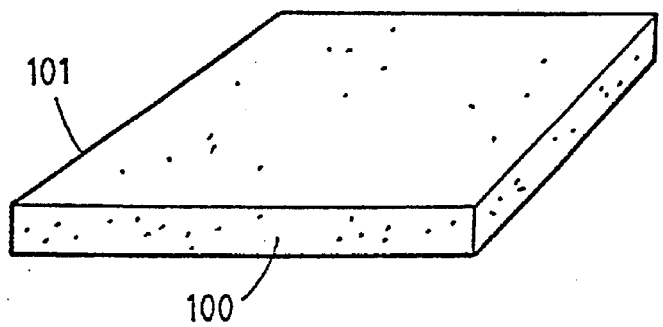
FIGS. 15 to 19 show diagrammatically, in perspective, various examples of composite components comprising a reinforcement produced in accordance with the invention.
Figure 16:
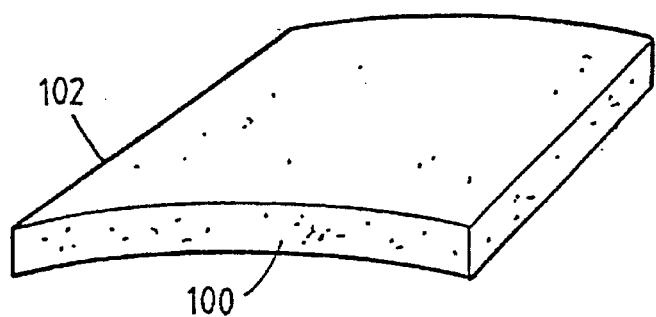
Figure 17:
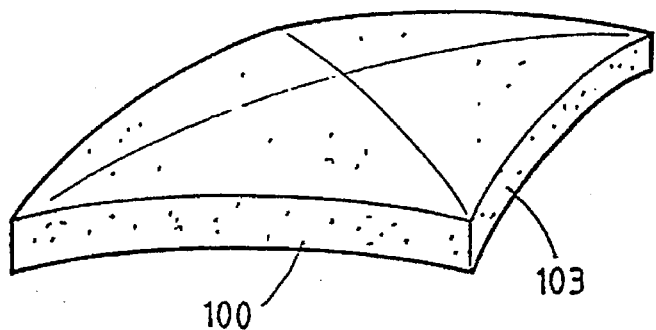
Figure 18:
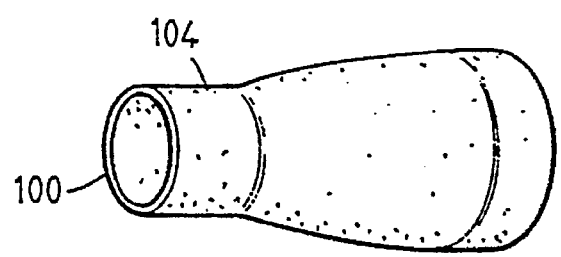
Figure 19:
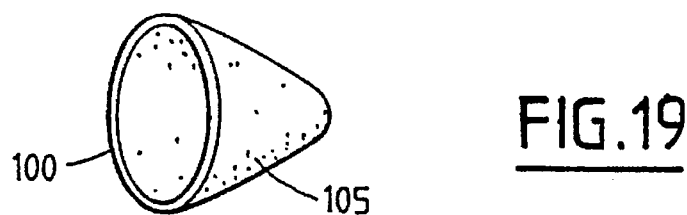

FIGS. 15 to 19 show, by way of examples, various composite components comprising a reinforcement produced in accordance with the invention and embedded in a cured matrix 100. Thus, FIG. 15 shows a flat panel 101, FIG. 16 a convex panel 102 (comprising the reinforcement of FIGS. 1 to 3), FIG. 17 a hi-convex panel 103, FIG. 18 a nozzle 104 of a rocket motor and FIG. 19 a spacecraft nose cone.

We claim:

1. A machine for implementing a method for producing a reinforcement for a composite component, said machine comprising a stand provided with a subframe and with uprights each having a slideway for mounting a transverse bar on which is mounted a carriage, which can move in a first, X, direction, equipped with a first arm extending in a second, Y, direction orthogonal to the X direction and carrying a second arm able to slide transversely with respect to the plane defined by said bar and said first arm in a third, Z, direction, motor means for driving said carriage and said first and second arms, and a thread-stitching tool mounted on the second arm, comprising, at its end, a needle, wherein said stitching tool also constitutes a tool for laying down the thread and is mounted on a rotary support (41, 53) at the lower end of which is arranged said needle (33).

2. The machine as claimed in claim 1, therein said needle (33) is hollow and wherein a thread-guiding channel (41A) connected to said needle passes through said rotary support (41).

3. The machine as claimed in claim 1, wherein said needle (33) has an oblique through-eye (48) and is associated with a thread-guide (50) comprising a body through which passes obliquely a channel (51) for passage of the thread, the lower end (51A) of said channel being flared.

4. The machine as claimed in claim 1, wherein the laying-down and stitching tool comprises a mechanism for actuating the presser-foot (43)/thread-guide (50)/needle (33) assembly, consisting of a first cylinder actuator (54) actuating a plate (55) on which said assembly is mounted, a spindle (57) carrying the thread-guide and a second cylinder actuator (59) actuating the presser-foot (43).

5. The machine as claimed in claim 4, wherein said needle (33) is held in position on said plate (55) by means of a support (58), using a conical clamp (64) tightened by a nut (65).

6. The machine as claimed in claim 4, wherein the spindle (57) carrying the thread-guide (50) is stressed by a tensioning spring (62) and retained by a stop (63).

* * * * *

UNITED STATES PATENT AND TRADEMARK OFFICE
CERTIFICATE OF CORRECTION

PATENT NO.  : 5,642,679
DATED       : July 1, 1997
INVENTOR(S) : MONGET et al.

It is certified that error appears in the above-identified patent and that said Letters Patent is hereby corrected as shown below:

Title page, item [73], after "Assignee", "Societe Nationale Industrielle et Aerospatiale" should be --Aerospatiale Societe Nationale Industrielle--

Signed and Sealed this

Fourteenth Day of October, 1997

Attest:

BRUCE LEHMAN

Attesting Officer

Commissioner of Patents and Trademarks